US008873189B2

United States Patent
Hironaka

(10) Patent No.: US 8,873,189 B2
(45) Date of Patent: Oct. 28, 2014

(54) MAGNETIC DISK DEVICE AND DISTURBANCE COMPENSATION METHOD FOR DUAL-STAGE ACTUATOR

(75) Inventor: Hideki Hironaka, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 71 days.

(21) Appl. No.: 13/551,325

(22) Filed: Jul. 17, 2012

(65) Prior Publication Data

US 2013/0194697 A1   Aug. 1, 2013

(30) Foreign Application Priority Data

Jan. 31, 2012   (JP) .................................. 2012-018070

(51) Int. Cl.
*G11B 21/02*  (2006.01)
*G11B 5/596*  (2006.01)

(52) U.S. Cl.
USPC ........................ 360/75; 360/78.05; 360/78.09

(58) Field of Classification Search
USPC ......... 360/78.12, 75, 51, 77.13, 77.02, 78.09, 360/73.03, 77.06, 77.03, 78.05; 369/44.27, 369/44.28, 53.14, 53.15
See application file for complete search history.

(56) References Cited

U.S. PATENT DOCUMENTS

| | | | | |
|---|---|---|---|---|
| 4,967,293 A * | 10/1990 | Aruga et al. | ............... | 360/78.12 |
| 5,402,400 A * | 3/1995 | Hamada et al. | ............ | 360/78.06 |
| 5,768,226 A * | 6/1998 | Ogino | ......................... | 369/44.28 |
| 6,185,171 B1 * | 2/2001 | Bassett et al. | .............. | 369/53.18 |
| 6,760,180 B2 | 7/2004 | Kino et al. | | |
| 6,833,974 B2 * | 12/2004 | Koso et al. | .................. | 360/78.05 |
| 7,038,877 B2 * | 5/2006 | Kohso et al. | ............... | 360/78.05 |
| 7,292,403 B2 * | 11/2007 | Baek et al. | ................. | 360/77.02 |
| 7,468,857 B2 * | 12/2008 | Hutsell et al. | .............. | 360/77.03 |
| 7,548,396 B2 * | 6/2009 | Higashino | .................. | 360/78.05 |
| 7,679,856 B2 * | 3/2010 | Ishiguro | .......................... | 360/75 |
| 8,446,687 B2 * | 5/2013 | Hironaka et al. | .......... | 360/78.05 |

FOREIGN PATENT DOCUMENTS

| | | |
|---|---|---|
| JP | 11-306702 | 11/1999 |
| JP | 2002-304862 | 10/2002 |
| JP | 2003-141833 | 5/2003 |

\* cited by examiner

*Primary Examiner* — Nabil Hindi
(74) *Attorney, Agent, or Firm* — Patterson & Sheridan, LLP

(57) ABSTRACT

A magnetic disk device according to one embodiment includes: a disturbance vibration detector; a movement position controller; and a disturbance compensation module. The disturbance vibration detector detects a disturbance vibration component with respect to a fine-movement actuator. The movement position controller drives each of the fine-movement actuator and a coarse-movement actuator to control a movement position of a magnetic head. The disturbance compensation module corrects the movement position so as to suppress the disturbance vibration component detected by the disturbance vibration detector.

19 Claims, 7 Drawing Sheets

MAGNETIC DISK DEVICE AND DISTURBANCE COMPENSATION METHOD FOR DUAL-STAGE ACTUATOR

CROSS-REFERENCE TO RELATED APPLICATIONS

This application is based upon and claims the benefit of priority from Japanese Patent Application No. 2012-018070, filed on Jan. 31, 2012; the entire contents of which are incorporated herein by reference.

FIELD

Embodiments described herein relate generally to a magnetic disk device and a disturbance compensation method for a dual-stage actuator.

BACKGROUND

In a magnetic disk device, a voice coil motor is generally used as an actuator to move a magnetic head. This voice coil motor has a limitation on ensuring a tracking control accuracy along with the miniaturization of track pitches. In view of this, there is proposed a dual-stage actuator having a configuration in which a fine-movement actuator incorporating a piezoelectric element is mounted on a coarse-movement actuator incorporating a voice coil motor.

DETAILED DESCRIPTION

A magnetic disk device according to one embodiment includes: a magnetic disk; a magnetic head provided to the magnetic disk; a fine-movement actuator; a coarse-movement actuator; a disturbance vibration detector; a movement position controller; and a disturbance compensation module. The fine-movement actuator allows a fine movement of the magnetic head. The coarse-movement actuator allows a coarse movement of the magnetic head. The disturbance vibration detector detects a disturbance vibration component with respect to the fine-movement actuator. The movement position controller drives each of the fine-movement actuator and the coarse-movement actuator to control a movement position of the magnetic head. The disturbance compensation module corrects the movement position so as to suppress the disturbance vibration component detected by the disturbance vibration detector.

Hereinafter, a magnetic disk device and a disturbance compensation method for a dual-stage actuator according to embodiments will be described with reference to the drawings. The present invention is not limited to the following embodiments.

First Embodiment

Figure 1:
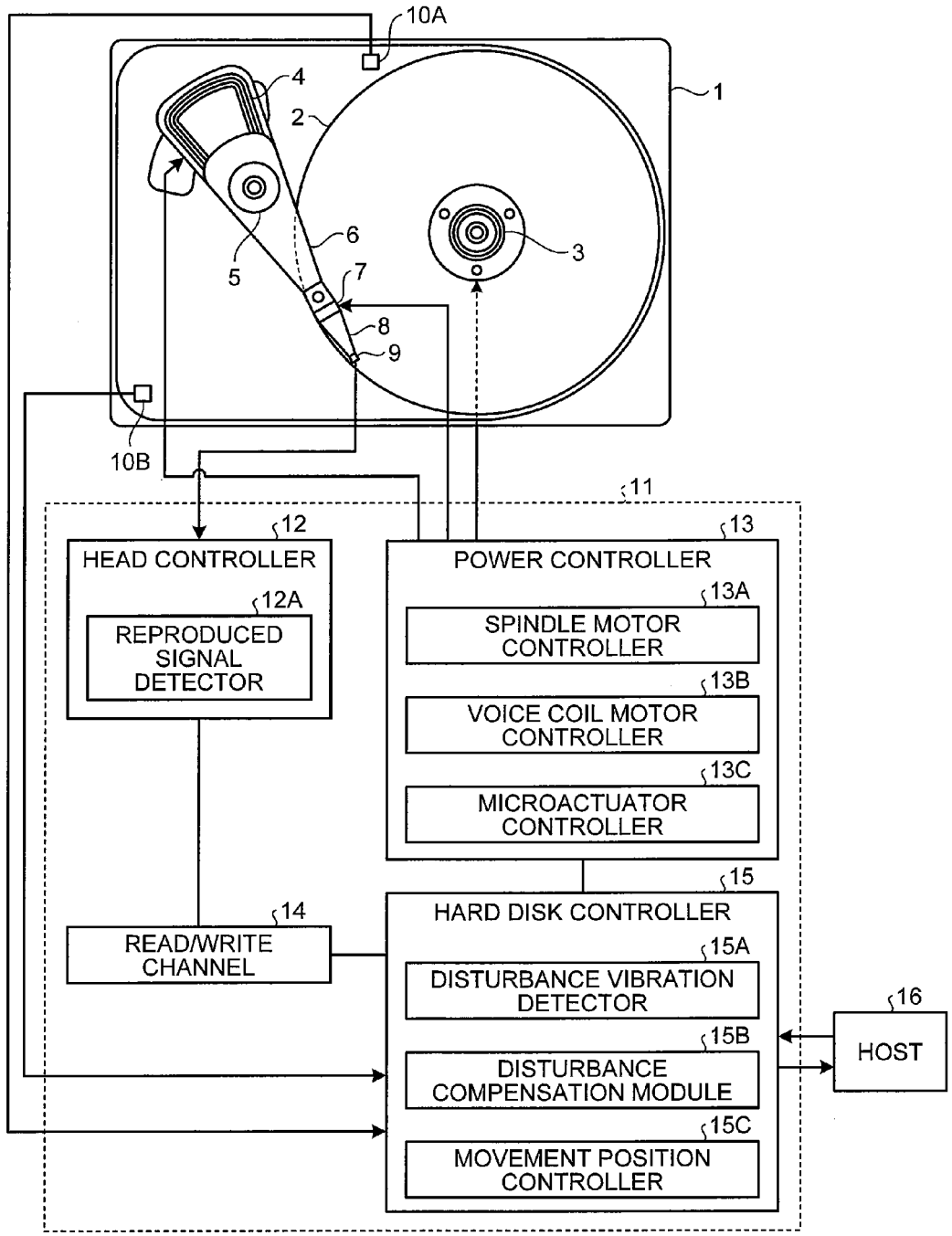
FIG. 1 is a block diagram showing a schematic configuration of a magnetic disk device according to a first embodiment.

FIG. 1 is a block diagram showing a schematic configuration of a magnetic disk device according to a first embodiment.

In FIG. 1, this magnetic disk device is provided with a magnetic disk 2. The magnetic disk 2 is supported via a spindle 3. The magnetic disk device is also provided with a magnetic head 9. The magnetic head 9 is disposed to be opposed to the magnetic disk 2. In this case, the magnetic head 9 is held on the magnetic disk 2 via a suspension 8 and an arm 6. The arm 6 is supported on the magnetic disk 2 via a rotation axis 5.

A voice coil motor 4 that drives the arm 6 is provided at one end of the arm 6. A microactuator 7 that drives the suspension 8 is provided at one end of the suspension 8. For example, a piezoelectric element may be used as the microactuator 7. The microactuator 7 is supported by the arm 6 to form the dual-stage actuator. Acceleration sensors 10A and 10B are provided on a base material on which this dual-stage actuator is mounted. The acceleration sensors 10A and 10B can be disposed so as to detect an acceleration of two components orthogonal to each other on the base material on which the dual-stage actuator is mounted. For example, the acceleration sensors 10A and 10B may be mounted on a printed board on which the dual-stage actuator is mounted, or may be mounted on a case 1 housing the dual-stage actuator. More alternatively, the acceleration sensors 10A and 10B may be mounted on a printed board fixed to the outside of the case 1.

The magnetic disk 2, the spindle 3, the voice coil motor 4, the arm 6, the microactuator 7, the suspension 8, the magnetic head 9, and the acceleration sensors 10A and 10B are housed in the case 1.

The magnetic disk device is provided with a magnetic recording controller 11. The magnetic recording controller 11 is provided with a head controller 12, a power controller 13, a read/write channel 14, and a hard disk controller 15. The magnetic recording controller 11 can be mounted on a printed board fixed to the back surface side of the case 1. The acceleration sensors 10A and 10B may be mounted on this printed board. The head controller 12 is provided with a reproduced signal detector 12A. The power controller 13 is provided with a spindle motor controller 13A, a voice coil motor controller 13B, and a microactuator controller 13C. The hard disk controller 15 is provided with a disturbance vibration detector 15A, a disturbance compensation module 15B, and a movement position controller 15C.

The head controller 12 can amplify signals during recording and reproduction. The reproduced signal detector 12A can detect signals read by the magnetic head 9. The power controller 13 can drive each of the voice coil motor 4 and the microactuator 7 and can also drive the spindle motor that allows the spindle 3 to rotate. The spindle motor controller 13A can control the rotation of the spindle motor. The voice coil motor controller 13B can control driving of the voice coil motor 4. The microactuator controller 13C can control driving of the microactuator 7. The read/write channel 14 can convert signals to be reproduced by the magnetic head 9 into a data format to be dealt with by a host 16, and also can convert data output from the host 16 into a signal format to be recorded by the magnetic head 9. Examples of such format conversion include DA conversion and encoding. The read/write channel 14 enables decoding processing on signals reproduced by the magnetic head 9, and also enables code modulation of data output from the host 16. The hard disk controller 15 can perform a recording/reproduction control based on an instruction from the host 16, and also can deliver data between the host 16 and the read/write channel 14.

The magnetic recording controller 11 is connected to the host 16. Note that the host 16 may be a personal computer that instructs the magnetic disk device to perform data writing or reading, or may be an external interface.

While the magnetic disk 2 is rotated by the spindle motor, signals are read from the magnetic disk 2 through the magnetic head 9, and the signals are detected by the reproduced signal detector 12A. The signals detected by the reproduced signal detector 12A are subjected to data conversion by the read/write channel 14 and are then sent to the hard disk controller 15. In the movement position controller 15C, the movement position of the magnetic head 9 is controlled based on servo pattern data contained in the signals detected by the reproduced signal detector 12A.

At this time, the acceleration detected by the acceleration sensors 10A and 10B is sent to the hard disk controller 15. In the disturbance vibration detector 15A, a disturbance angle acceleration component is detected based on the result of the detection by the acceleration sensors 10A and 10B and is sent to the disturbance compensation module 15B. In the disturbance compensation module 15B, driving of each of the voice coil motor 4 and the microactuator 7 is controlled so as to suppress the disturbance angle acceleration component detected by the disturbance vibration detector 15A, and the movement position of the magnetic head 9 is corrected.

In this case, a disturbance in a broader bandwidth including a radio frequency can be compensated for by controlling the driving of the microactuator 7 so as to suppress the disturbance angle acceleration component. This results in improvement of the accuracy of positioning of the magnetic head 9 by the dual-stage actuator.

Second Embodiment

Figure 2:
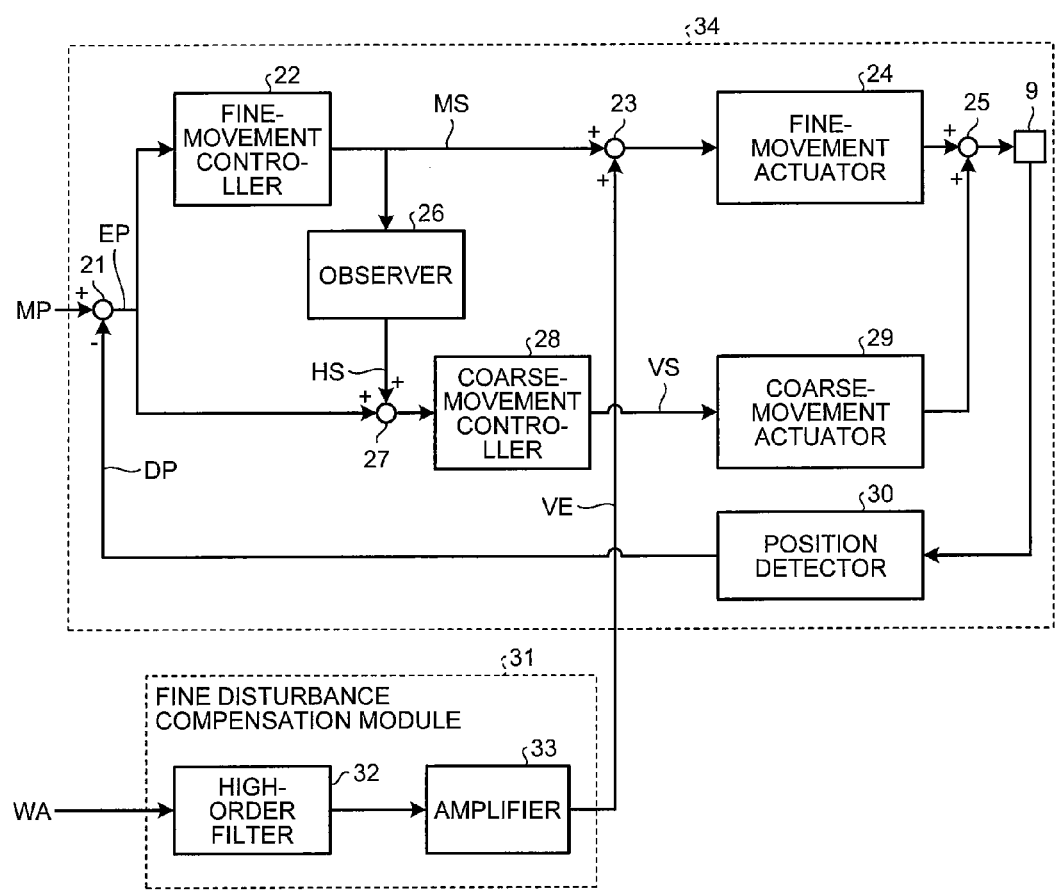
FIG. 2 is a block diagram showing a schematic configuration of a control system of a dual-stage actuator according to a second embodiment.

FIG. 2 is a block diagram showing a schematic configuration of a control system of a dual-stage actuator according to a second embodiment.

In FIG. 2, this control system is provided with a feedback control system 34 and a fine disturbance compensation module 31. In this case, the feedback control system 34 performs a feedback control based on the detection result as to the movement position of the magnetic head 9, thereby allowing a fine-movement actuator 24 and a coarse-movement actuator 29 to be driven. The fine disturbance compensation module 31 performs a feed-forward control based on a disturbance angle acceleration component WA, thereby enabling compensation of the disturbance of the fine-movement actuator 24.

In this case, the feedback control system 34 is provided with the magnetic head 9, the fine-movement actuator 24, the coarse-movement actuator 29, a fine-movement controller 22, a coarse-movement controller 28, an observer 26, a subtractor 21, adders 23, 25, and 27, and a position detector 30. The fine disturbance compensation module 31 is provided with a high-order filter 32 and an amplifier 33.

The fine-movement actuator 24 allows fine movements of the magnetic head 9. A piezoelectric element, for example, may be used as the fine-movement actuator 24. The coarse-movement actuator 29 allows coarse movements of the magnetic head 9. A voice coil motor, for example, may be used as the coarse-movement actuator 29. The fine-movement controller 22 controls driving of the fine-movement actuator 24, thereby enabling a fine control of the movement position of the magnetic head 9. The coarse-movement controller 28 controls driving of the coarse-movement actuator 29 in cooperation with the drive control of the fine-movement actuator 24, thereby enabling a coarse control of the movement position of the magnetic head 9. The observer 26 can correct an error position EP, which is input to the coarse-movement controller 28, so as to control driving of fine-movement actuator 24 and the coarse-movement actuator 29 in cooperation with the drive control of the fine-movement actuator 24. The position detector 30 can detect the position of the magnetic head 9 based on the signal read by the magnetic head 9. The high-order filter 32 can convert the disturbance angle acceleration component WA into a position component, and can also perform a second-order integration operation and a high-pass filter operation on the disturbance angle acceleration component WA.

The adder 25 adds the amount of movement of the coarse-movement actuator 29 and the amount of movement of the fine-movement actuator 24. The movement position of the magnetic head 9 is controlled based on the addition result. Signals are read from the magnetic disk through the magnetic head 9 and are sent to the position detector 30. In the position detector 30, a detected position DP of the magnetic head 9 is generated based on a servo pattern contained in the signals read from the magnetic head 9, and is sent to the subtractor 21. In the subtractor 21, the error position EP is generated by subtracting the detected position DP from a target position MP of the magnetic head 9, and is sent to each of the fine-movement controller 22 and the adder 27.

In the fine-movement controller 22, a fine-movement control value MS of the fine-movement actuator 24 is generated based on the error position EP, and is sent to each of the observer 26 and the adder 23. In the observer 26, an estimated value HS is generated from the fine-movement control value MS so as to control the coarse-movement actuator 29 in cooperation with the fine-movement actuator 24, and is sent to the adder 27. In the adder 27, the error position EP and the estimated value HS are added, and the addition result is sent to the coarse-movement controller 28. In the coarse-movement controller 28, a coarse-movement control value VS of the coarse-movement actuator 29 is generated based on the result of the addition of the error position EP and the estimated value HS, and is sent to the coarse-movement actuator 29.

The disturbance angle acceleration component WA is input to the high-order filter 32. In the high-order filter 32, after execution of the second-order integration operation and the highpass filter operation on the disturbance angle acceleration component WA, the amplifier 33 multiplies a gain to generate a fine-movement correction value VE to be sent to the adder 23. In the adder 23, the fine-movement control value MS and the fine-movement correction value VE are added, and the addition result is sent to the fine-movement actuator 24.

The fine-movement actuator 24 is driven based on the addition result of the fine-movement control value MS and the fine-movement correction value VE, and the coarse-movement actuator 29 is driven based on the coarse-movement control value VS, thereby controlling the movement position of the magnetic head 9.

In this case, the fine-movement control value MS is corrected with the fine-movement correction value VE, thereby enabling driving of the fine-movement actuator 24 so as to suppress the disturbance angle acceleration component WA. This results in improvement of the accuracy of positioning of the magnetic head 9 by the dual-stage actuator.

Third Embodiment

Figure 3:
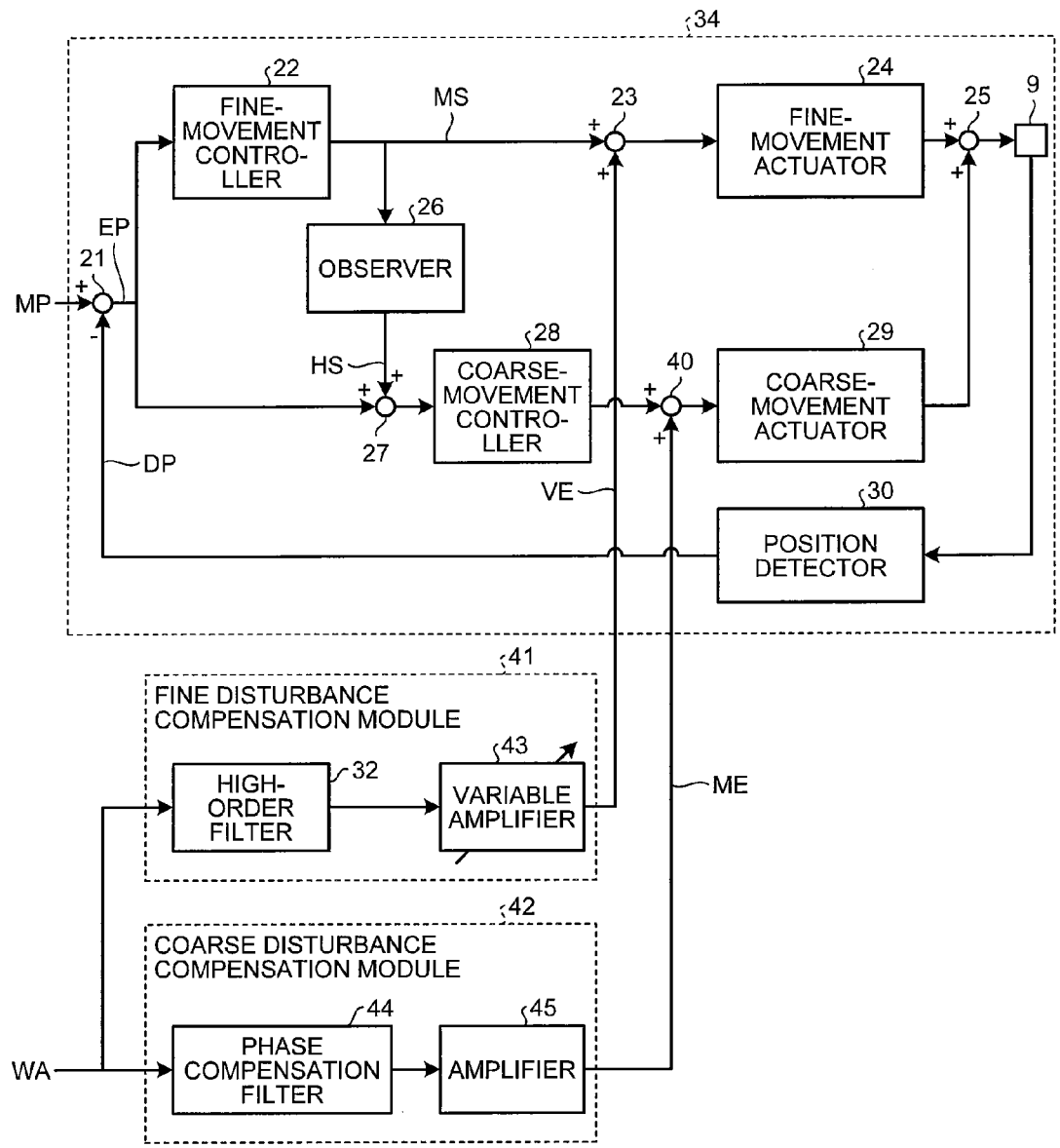
FIG. 3 is a block diagram showing a schematic configuration of a control system of a dual-stage actuator according to a third embodiment.

FIG. 3 is a block diagram showing a schematic configuration of a control system of a dual-stage actuator according to a third embodiment.

Referring to FIG. 3, in this control system, a fine disturbance compensation module 41 is provided in place of the fine disturbance compensation module 31 shown in FIG. 2, and a coarse disturbance compensation module 42 and an adder 40 are added to the fine disturbance compensation module 31 shown in FIG. 2.

The fine disturbance compensation module 41 performs a feed-forward control based on the disturbance angle acceleration component WA, thereby enabling compensation of the disturbance of the fine-movement actuator 24. In this case, the fine disturbance compensation module 41 is provided with a variable amplifier 43 in place of the amplifier 33 shown in FIG. 2. The coarse disturbance compensation module 42 performs a feed-forward control based on the disturbance angle acceleration component WA, thereby enabling compensation of the disturbance of the coarse-movement actuator 29. In this case, the coarse disturbance compensation module 42 is provided with a phase compensation filter 44 and an amplifier 45. The phase compensation filter 44 can compensate for the phase of the disturbance angle acceleration component WA.

The fine disturbance compensation module 41 corrects the fine-movement control value MS based on a high-frequency component of the disturbance angle acceleration component WA. The coarse disturbance compensation module 42 can correct the coarse-movement control value VS based on a low-frequency component of the disturbance angle acceleration component WA. The fine disturbance compensation module 41 can reduce the amount of correction of the fine-movement control value MS during seeking as compared to that during tracking, and the coarse disturbance compensation module 42 can increase the amount of correction of the coarse-movement control value VS during seeking as compared to that during tracking.

In the subtractor 21, the error position EP is generated by subtracting the detected position DP from the target position MP of the magnetic head 9, and is sent to each of the fine-movement controller 22 and the adder 27.

In the fine-movement controller 22, the fine-movement control value MS of the fine-movement actuator 24 is generated based on the error position EP, and is sent to each of the observer 26 and the adder 23. In the observer 26, the estimated value HS is generated from the fine-movement control value MS so as to control the coarse-movement actuator 29 in cooperation with the fine-movement actuator 24, and is sent to the adder 27. In the adder 27, the error position EP and the estimated value HS are added, and the addition result is sent to the coarse-movement controller 28.

In the coarse-movement controller 28, the coarse-movement control value VS of the coarse-movement actuator 29 is generated based on the result of the addition of the error position EP and the estimated value HS, and is sent to the adder 40.

The disturbance angle acceleration component WA is input to each of the high-order filter 32 and the phase compensation filter 44. In the high-order filter 32, after execution of the second-order integration operation and the highpass filter operation on the disturbance angle acceleration component WA, the amplifier 43 multiplies a gain to generate the fine-movement correction value VE to be sent to the adder 23. In the phase compensation filter 44, after execution of a phase compensation of the disturbance angle acceleration component WA, the amplifier 45 multiplies a gain to generate the coarse-movement correction value ME to be sent to the adder 40. In this case, in the variable amplifier 43, the gain is reduced during seeking as compared to that during tracking, thereby reducing the fine-movement correction value VE. In the phase compensation filter 44, the coarse-movement correction value ME is increased during seeking as compared to that during tracking.

In the adder 23, the fine-movement control value MS and the fine-movement correction value VE are added, and the addition result is sent to the fine-movement actuator 24. Further, in the adder 40, the coarse-movement control value VS and the coarse-movement correction value ME are added, and the addition result is sent to the coarse-movement actuator 29.

The fine-movement actuator 24 is driven based on the result of the addition of the fine-movement control value MS and the fine-movement correction value VE, and the coarse-movement actuator 29 is driven based on the result of the addition of the coarse-movement control value VS and the coarse-movement correction value ME, thereby controlling the movement position of the magnetic head 9.

In this case, the fine-movement control value MS is corrected with the fine-movement correction value VE, and the coarse-movement control value VS is corrected with the coarse-movement correction value ME. This enables driving of each of the fine-movement actuator 24 and the coarse-movement actuator 29 so as to suppress the disturbance angle acceleration component WA. This results in improvement of the accuracy of positioning of the magnetic head 9 by the dual-stage actuator.

Figure 4A:
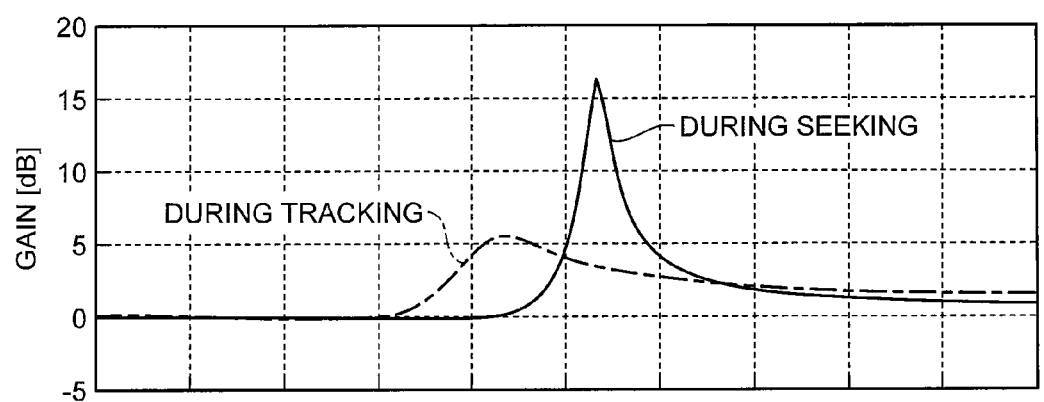
FIG. 4A is a diagram showing gain characteristics of a phase compensation filter shown in FIG. 3.
Figure 4B:
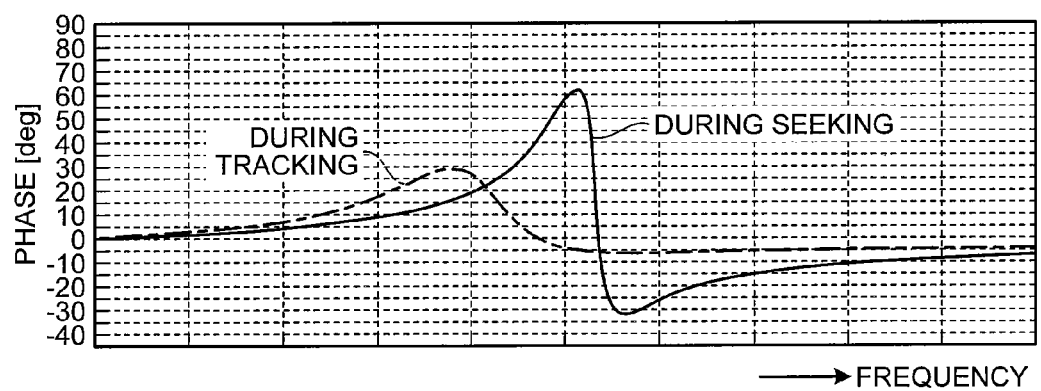
FIG. 4B is a diagram showing phase characteristics of the phase compensation filter shown in FIG. 3.

FIG. 4A is a diagram showing gain characteristics of the phase compensation filter shown in FIG. 3. FIG. 4B is a diagram showing phase characteristics of the phase compensation filter shown in FIG. 3.

In FIGS. 4A and 4B, the characteristics of the phase compensation filter 42 are set to extend a bandwidth in the vicinity of the zero cross of the phase. The coarse-movement correction value ME is increased by increasing the gain during seeking as compared to that during tracking.

In this case, the coarse-movement correction value ME is increased during seeking as compared to that during tracking, thereby allowing the coarse-movement actuator 29 having a wide movement range to mainly operate. This enables a high-speed seek operation. The fine-movement correction value VE is increased during seeking as compared to that during tracking, thereby allowing the fine-movement actuator 24 having a high positioning accuracy to mainly operate. This enables improvement in tracking accuracy.

Fourth Embodiment

Figure 5:
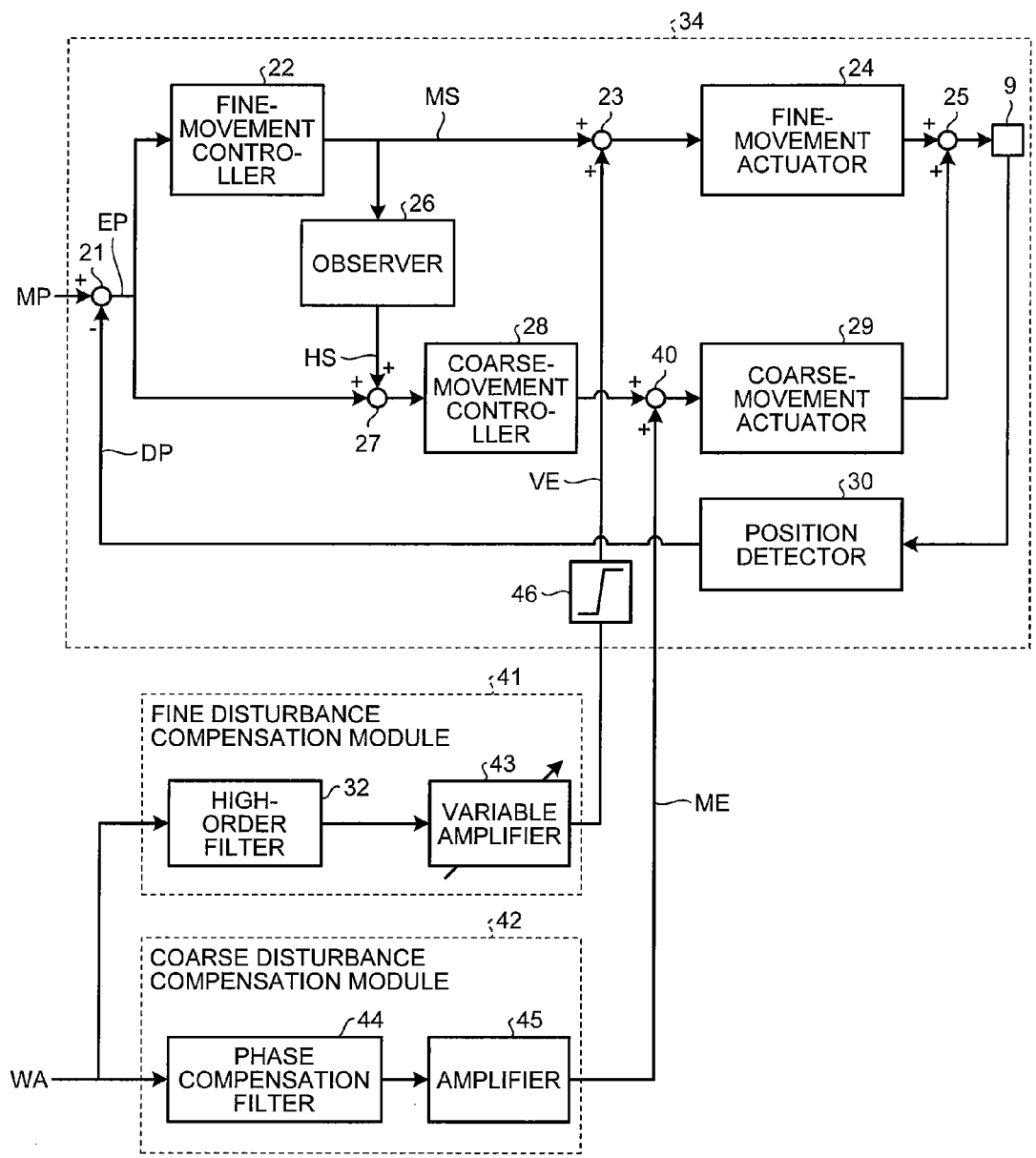
FIG. 5 is a block diagram showing a schematic configuration of a control system of a dual-stage actuator according to a fourth embodiment.

FIG. 5 is a block diagram showing a schematic configuration of a control system of a dual-stage actuator according to a fourth embodiment.

Referring to FIG. 5, in this control system, an output range limiter 46 is added to the control system shown in FIG. 3. This output range limiter 46 can be connected between the fine disturbance compensation module 41 and the adder 23. In this case, the output range limiter 46 can limit the output range of the fine disturbance compensation module 41. Specifically, the output range limiter 46 can set an upper limit value and a lower limit value of the output of the fine disturbance compensation module 41 so that the operation accuracy of the fine-movement actuator 24 falls within a favorable range.

By providing the output range limiter 46 at the subsequent stage of the fine disturbance compensation module 41, the output range of the fine disturbance compensation module 41 can be limited according to the movement range of the fine-movement actuator 24. Furthermore, even when the movement range of the fine-movement actuator 24 is narrow, the operation accuracy of the fine-movement actuator 24 can be maintained.

Fifth Embodiment

Figure 6:
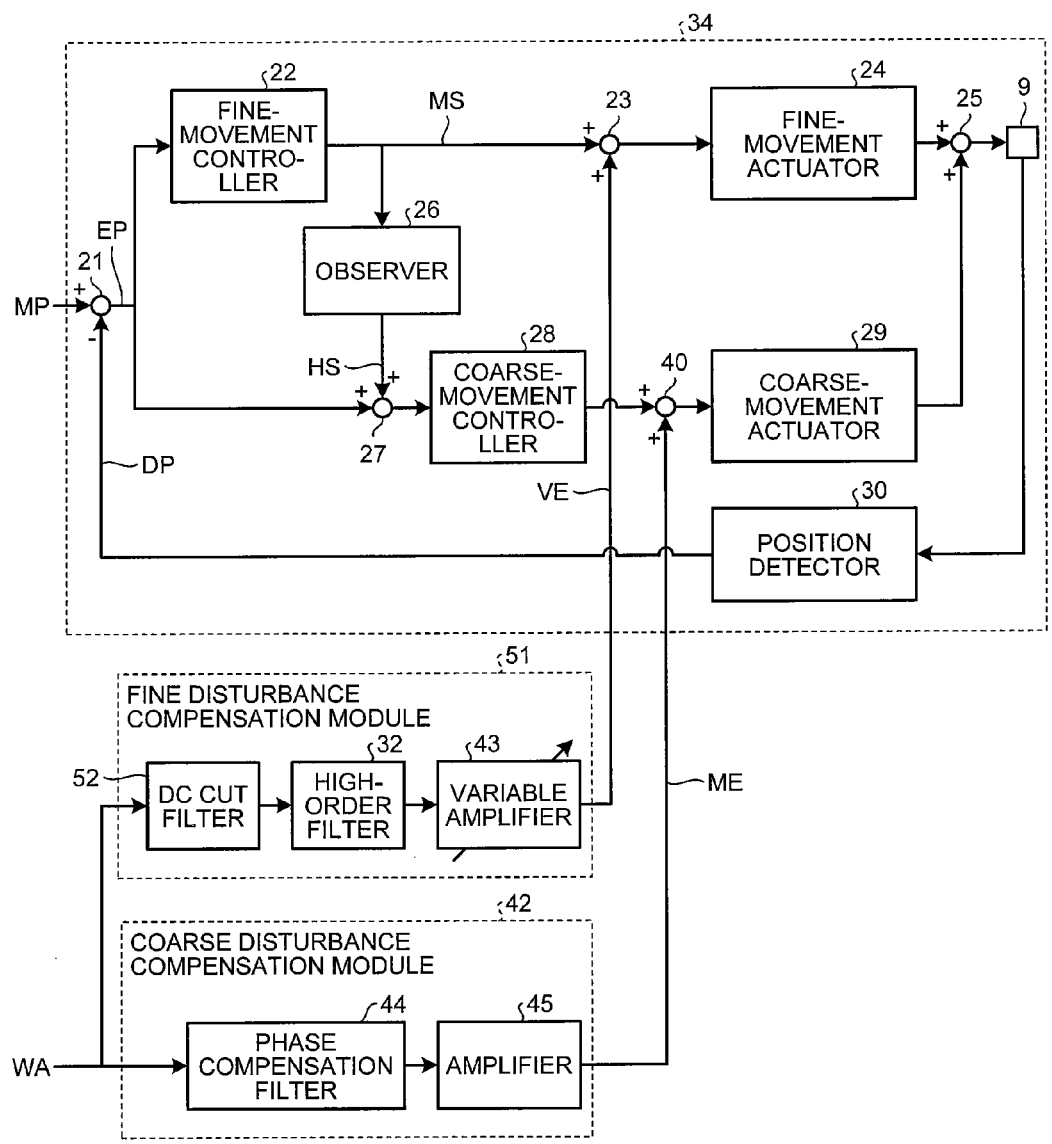
FIG. 6 is a block diagram showing a schematic configuration of a control system of a dual-stage actuator according to a fifth embodiment.

FIG. 6 is a block diagram showing a schematic configuration of a control system of a dual-stage actuator according to a fifth embodiment.

Referring to FIG. 6, in this control system, a DC cut filter 52 is added to the control system shown in FIG. 3. The DC cut filter 52 can be connected to the preceding stage of a fine disturbance compensation module 51. In this case, the DC cut filter 52 can eliminate a DC component from the disturbance angle acceleration component WA to be input to the fine disturbance compensation module 51.

The elimination of the DC component from the disturbance angle acceleration component WA to be input to the fine disturbance compensation module 51 can adverse effect on the second-order integration operation in the high-order filter 32.

Figure 7:
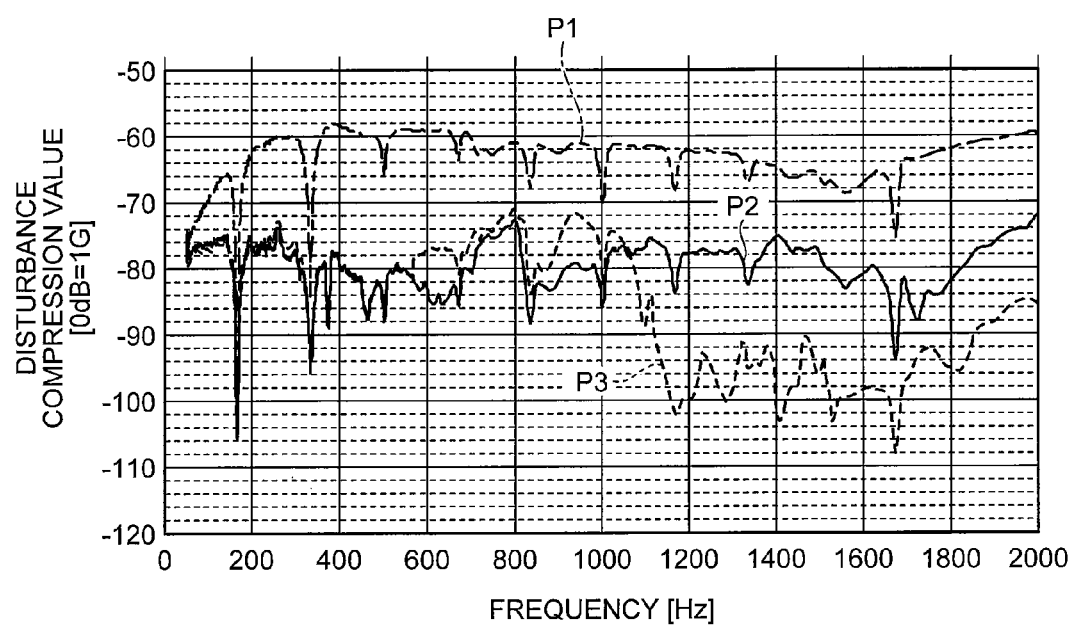
FIG. 7 is a diagram showing relationships between the presence or absence of disturbance compensation of a dual-stage actuator and compression characteristics.

FIG. 7 is a diagram showing relationships between the presence or absence of disturbance compensation of the dual-stage actuator and compression characteristics. Note that the compression characteristics of the dual-stage actuator can be used as an index of the vibration of the dual-stage actuator upon occurrence of a disturbance. Further, P1 represents a compression characteristic when the coarse-movement actuator 29 is used and the coarse disturbance compensation module 42 is omitted; P2 represents a compression characteristic when the coarse-movement actuator 29 is used and the coarse disturbance compensation module 42 is present; and P3 represents a compression characteristic when the fine-movement actuator 24 and the coarse-movement actuator 29 are used and the fine disturbance compensation module 41 and the coarse disturbance compensation module 42 are present.

The fine disturbance compensation module 41 is provided in FIG. 7, thereby making it possible to reduce the disturbance compression value in a high-frequency region of 1100 Hz or more by 10 dB or more.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
 a magnetic disk;
 a magnetic head provided to the magnetic disk;
 a fine-movement actuator configured to allow a fine movement of the magnetic head;
 a coarse-movement actuator configured to allow a coarse movement of the magnetic head;
 a movement position controller configured to control a movement position of the magnetic head by driving the fine-movement actuator and the coarse-movement actuator;
 a disturbance vibration detector configured to detect a disturbance vibration component with respect to the control of the movement position of the magnetic head; and
 a disturbance compensation module configured to correct the movement position so as to suppress the disturbance vibration component detected by the disturbance vibration detector,
 wherein the movement position controller comprises:
 a fine-movement controller configured to finely control the movement position of the magnetic head by performing a drive control of the fine-movement actuator based on an error position between a target position and a detected position of the magnetic head;
 a coarse-movement controller configured to coarsely control the movement position of the magnetic head by performing a drive control of the coarse-movement actuator based on the error position between the target position and the detected position of the magnetic head; and
 an observer configured to correct the error position between the target position and the detected position of the magnetic head such that the drive control of the coarse-movement actuator is performed in cooperation with the drive control of the fine-movement actuator,
 wherein the disturbance compensation module comprises a fine disturbance compensation module configured to correct the movement position controlled by the fine-movement controller so as to suppress the disturbance vibration component detected by the disturbance vibration detector,
 wherein the fine disturbance compensation module comprises:
 a high-order filter configured to convert the disturbance vibration component into a position component; and
 a first amplifier configured to adjust an output gain of the high-order filter,
 wherein the disturbance compensation module comprises a coarse disturbance compensation module configured to correct the movement position controlled by the coarse-movement controller so as to suppress the disturbance vibration component detected by the disturbance vibration detector,
 and wherein the fine disturbance compensation module is configured to correct the movement position based on a high-frequency component of the disturbance vibration component, and the coarse disturbance compensation module is configured to correct the movement position based on a low-frequency component of the disturbance vibration component.

2. A disturbance compensation method for a dual-stage actuator in a magnetic disk device, the magnetic disk device comprising: a magnetic head; a fine-movement actuator configured to allow a fine movement of the magnetic head; and a coarse-movement actuator configured to allow a coarse movement of the magnetic head, the disturbance compensation method comprising:
 generating an error position by subtracting a detected position from a target position of the magnetic head, a movement position of the magnetic head being controlled based on a cooperative operation of the fine-movement actuator and the coarse-movement actuator;

generating a fine-movement control value of the fine-movement actuator based on the error position;

generating an estimated value from the fine-movement control value so as to control the coarse-movement actuator in cooperation with the fine-movement actuator;

generating a coarse-movement control value of the coarse-movement actuator based on a result of addition of the error position and the estimated value;

generating a coarse-movement correction value to suppress a disturbance angle acceleration component based on the disturbance angle acceleration component with respect to the fine-movement actuator and the coarse-movement actuator;

driving the coarse-movement actuator based on a result of addition of the coarse-movement control value and the coarse-movement correction value;

generating a fine-movement correction value to suppress the disturbance angle acceleration component based on the disturbance angle acceleration component with respect to the fine-movement actuator; and driving the fine-movement actuator based on a result of addition of the fine-movement control value and the fine-movement correction value.

3. The disturbance compensation method of claim 2, wherein an acceleration sensor is disposed on a base material having the fine-movement actuator and the coarse-movement actuator mounted thereon, the acceleration sensor being used to detect the disturbance angle acceleration component.

4. The disturbance compensation method of claim 3, wherein the acceleration sensor is mounted on one of a printed board having the fine-movement actuator and the coarse-movement actuator mounted thereon, a case housing the fine-movement actuator and the coarse-movement actuator, and a printed board fixed to an outside of the case.

5. The disturbance compensation method of claim 2, wherein the magnetic disk device further comprises a movement position controller, the movement position controller comprising:

a fine-movement controller configured to finely control the movement position of the magnetic head by performing a drive control of the fine-movement actuator based on an error position between a target position and a detected position of the magnetic head;

a coarse-movement controller configured to coarsely control the movement position of the magnetic head by performing a drive control of the coarse-movement actuator based on the error position between the target position and the detected position of the magnetic head; and an observer configured to correct the error position to be input to the coarse-movement controller such that the drive control of the coarse-movement actuator is performed in cooperation with the drive control of the fine-movement actuator.

6. The disturbance compensation method of claim 5, wherein the magnetic disk device comprises a disturbance compensation module, the disturbance compensation module comprising a fine disturbance compensation module configured to correct the movement position controlled by the fine-movement controller so as to suppress the disturbance angle acceleration component detected by a disturbance vibration detector.

7. The disturbance compensation method of claim 6, wherein the fine disturbance compensation module comprises:

a high-order filter configured to convert the disturbance angle acceleration component into a position component; and a first amplifier configured to adjust an output gain of the high-order filter.

8. The disturbance compensation method of claim 7, wherein the disturbance compensation module comprises a coarse disturbance compensation module configured to correct the movement position controlled by the coarse-movement controller so as to suppress the disturbance angle acceleration component detected by the disturbance vibration detector.

9. The disturbance compensation method of claim 8, wherein the fine disturbance compensation module is configured to correct the movement position based on a high-frequency component of the disturbance angle acceleration component, and the coarse disturbance compensation module is configured to correct the movement position based on a low-frequency component of the disturbance angle acceleration component.

10. The disturbance compensation method of claim 6, further comprising a DC cut filter configured to eliminate a DC component from the disturbance angle acceleration component to be input to the fine disturbance compensation module.

11. The disturbance compensation method of claim 6, further comprising an output range limiter configured to limit an output range of the fine disturbance compensation module.

12. A magnetic disk device comprising:

a magnetic disk;

a magnetic head provided to the magnetic disk;

a fine-movement actuator configured to allow a fine movement of the magnetic head;

a coarse-movement actuator configured to allow a coarse movement of the magnetic head;

a movement position controller comprising:

a fine-movement controller configured to control the movement position of the magnetic head by using the fine-movement actuator based on an error position between a target position and a detected position of the magnetic head, and a coarse-movement controller configured to control the movement position of the magnetic head by using the coarse-movement actuator based on the error position between the target position and the detected position of the magnetic head;

a detector configured to detect a disturbance vibration component with respect to a control of a position of the magnetic head;

a fine disturbance compensation module configured to correct the movement position controlled by the fine-movement controller based on a high-frequency component of the disturbance vibration component so as to suppress the disturbance vibration component detected by the detector; and a coarse disturbance compensation module configured to correct the movement position controlled by the coarse-movement controller based on a low-frequency component of the disturbance vibration component so as to suppress the disturbance vibration component detected by the detector, wherein the fine disturbance compensation module comprises:

a high-order filter configured to convert the disturbance vibration component into a position component; and a first amplifier configured to adjust an output gain of the high-order filter.

13. The magnetic disk device of claim 12, wherein the movement position controller further comprises:
an observer configured to correct the error position to be input to the coarse-movement controller such that the drive control of the coarse-movement actuator is performed in cooperation with the drive control of the fine-movement actuator.

14. A magnetic disk device comprising:
a magnetic disk;
a magnetic head provided to the magnetic disk;
a fine-movement actuator configured to allow a fine movement of the magnetic head;
a coarse-movement actuator configured to allow a coarse movement of the magnetic head;
a movement position controller comprising:
a fine-movement controller configured to control the movement position of the magnetic head by using the fine-movement actuator based on an error position between a target position and a detected position of the magnetic head, and
a coarse-movement controller configured to control the movement position of the magnetic head by using the coarse-movement actuator based on the error position between the target position and the detected position of the magnetic head;
a detector configured to detect a disturbance vibration component with respect to a control of a position of the magnetic head;
a fine disturbance compensation module configured to correct the movement position controlled by the fine-movement controller based on a high-frequency component of the disturbance vibration component so as to suppress the disturbance vibration component detected by the detector;
a coarse disturbance compensation module configured to correct the movement position controlled by the coarse-movement controller based on a low-frequency component of the disturbance vibration component so as to suppress the disturbance vibration component detected by the detector; and
a DC cut filter configured to eliminate a DC component from the disturbance vibration component to be input to the fine disturbance compensation module.

15. The magnetic disk device of claim 12, further comprising a limiter configured to limit an output range of the fine disturbance compensation module.

16. The magnetic disk device of claim 13, further comprising a limiter configured to limit an output range of the fine disturbance compensation module.

17. The magnetic disk device of claim 14, wherein the movement position controller further comprises:
an observer configured to correct the error position to be input to the coarse-movement controller such that the drive control of the coarse-movement actuator is performed in cooperation with the drive control of the fine-movement actuator.

18. The magnetic disk device of claim 14, further comprising a limiter configured to limit an output range of the fine disturbance compensation module.

19. The magnetic disk device of claim 17, further comprising a limiter configured to limit an output range of the fine disturbance compensation module.

\* \* \* \* \*